United States Patent [19]

Hisabe et al.

[11] Patent Number: 4,998,033
[45] Date of Patent: Mar. 5, 1991

[54] GAS DYNAMIC BEARING FOR SPINDLE MOTOR

[75] Inventors: Yasushi Hisabe, Kanagawa; Noriyuki Osada, Tokyo; Toshihiro Ohtani, Kanagawa; Masahiko Kishi, Kanagawa; Yoshio Sato, Kanagawa; Daisuke Konno, Kanagawa; Sachihiko Miwa, Kanagawa; Toshiya Kanamori, Kanagawa; Shunichi Aiyoshizawa, Tokyo; Kazuyuki Kasahara, Kanagawa; Kazuto Hirokawa, Kanagawa; Yumiko Noda, Kanagawa, all of Japan

[73] Assignee: Ebara Corporation, Tokyo, Japan

[21] Appl. No.: 506,183

[22] Filed: Apr. 9, 1990

[30] Foreign Application Priority Data

Apr. 12, 1989 [JP] Japan ................................. 1-92161
Jul. 12, 1989 [JP] Japan ................................ 1-179647
Aug. 8, 1989 [JP] Japan ................................ 1-205077
Aug. 30, 1989 [JP] Japan ............................... 1-223679

[51] Int. Cl.$^5$ ........................ F16C 35/10; H02K 5/16; H02K 21/22
[52] U.S. Cl. .................................... 310/67 R; 310/90; 360/98.07; 384/112
[58] Field of Search .................. 310/67 R, 90, 90.5; 360/98.06, 99.04, 98.07; 384/107, 111, 100, 121, 132, 112

[56] References Cited

U.S. PATENT DOCUMENTS

| 4,200,344 | 4/1980 | Binns et al. ............. | 384/107 |
| 4,509,160 | 4/1985 | Eggers ..................... | 360/103 |
| 4,538,081 | 8/1985 | Kamiya et al. ........... | 310/90.5 |
| 4,673,997 | 6/1987 | Gowda et al. ............ | 310/90.5 |
| 4,822,182 | 4/1989 | Matsushita et al. ...... | 384/107 |
| 4,824,122 | 4/1989 | Raj et al. .................. | 384/133 |
| 4,934,781 | 6/1990 | Kato et al. ................ | 310/90.5 |

FOREIGN PATENT DOCUMENTS

| 59-28757 | 2/1984 | Japan . |
| 63-87162 | 4/1988 | Japan . |
| 63-100416 | 5/1988 | Japan . |
| 63-241515 | 10/1988 | Japan . |
| 63-241516 | 10/1988 | Japan . |
| 63-241517 | 10/1988 | Japan . |

OTHER PUBLICATIONS

Design of Gas Bearings, 1972, vols. I and II.
Ebara Engineering Review No. 143, Apr. 1989.
Journal of Japanses Society of Tribologists, vol. 34, No. 2, Feb. 15, 1989.

Primary Examiner—Steven L. Stephan
Assistant Examiner—D. L. Rebsch
Attorney, Agent, or Firm—Wenderoth, Lind & Ponack

[57] ABSTRACT

A spindle motor comprising a stator including a support shaft positioned on a base, a cap-shaped rotor rotatably and concentrically disposed around the support shaft, thrust and radial bearings disposed between the stator and the rotor, a stator coil secured to the stator, and a rotor magnet member secured to the rotor opposing the stator coil. The thrust and radial bearings are hydrodynamic bearings. A movable piece that constitutes a part of the thrust bearing is secured to the lower end of a cylindrical portion of the rotor and extended outwardly or inwardly from the cylindrical portion, or is disposed above the rotor. The stator coil is secured to the outer peripheral portion of the support shaft above or below the radial bearing. The rotor magnet member is securd to the inner peripheral surface or inner top surface of the rotor. Either a radial or axial gap is provided between the stator coil and the rotor magnet member.

28 Claims, 11 Drawing Sheets

GAS DYNAMIC BEARING FOR SPINDLE MOTOR

BACKGROUND OF THE INVENTION

The present invention relates to a spindle motor capable of rotating at high speed, which employs hydrodynamic bearings as radial and thrust bearings. More particularly, the present invention relates to a spindle motor which is designed to rotate with minimal vibrations irrespective of the position of the motor when used and hence is suitable for a hard disk driver (hereinafter referred to as simply "HDD").

With the achievement of HDD's with a high storage capacity and low power consumption, demand has been made for improvements in the performance of spindle motors which are used to drive them so as to be even more suitable therefor.

FIG. 16 schematically shows a conventional spindle motor which is actually used in an HDD, and FIG. 15 is a partially sectioned elevational view of the conventional spindle motor. The spindle motor 20 has a shaft support cylinder 22 in the center of a mount 21. A stator coil 23 which comprises a plurality of electromagnetic coils is secured to the outer periphery of the shaft support cylinder 22. A rotary shaft 25 is rotatably supported by the inner periphery of the shaft support cylinder 22 by ball bearings 24. The rotary shaft 25 has a support member 27 secured to the upper end thereof, the support member 27 being arranged such that hard disks 30 are fixedly mounted on the outer peripheral surface thereof. The support member 27 has a plurality of rotor magnet members 28 secured to the inner peripheral surface in opposing relation to the stator coil 23.

In the above-described spindle motor employing ball bearings, the magnitude of vibrations of the spindle motor depends on the internal clearances of the ball bearings. The magnitude of vibrations in the radial direction is substantially equal to the radial internal clearance of the ball bearings. Similarly, the magnitude of vibrations in the thrust direction is substantially equal to the thrust internal clearance of the ball bearings. Measures have been taken to reduce these internal clearances, for example, by preloading the ball bearings. However, no satisfactory internal clearance value has heretofore been obtained, i.e., it has been only possible to achieve 0.5 microns or so in terms of the non-repeated component of the runout in the radial direction. In addition, preloading of ball bearings results in an increase in the required torque of the motor instead and hence retrogresses to the desirous lowering in the power consumption of the HDD. Accordingly, as long as ball bearings such as those described above are used, it is in principle virtually impossible to further reduce the vibrations of the spindle motor.

In addition, it is necessary to use small-sized ball bearings for the above-described spindle motor, which involves the problem that the HDD is not shock resistant and is therefore inferior in durability. With regard to the achievement of high speed, i.e., 3,600 rpm→5,400 rpm→6,400 rpm, the prior art suffers from the problem of how to minimize the wear of the bearings. Further, since the prior art uses a lubricating oil (grease), the degree of cleanliness is low.

In case of a spindle motor whose bearings are only replaced by hydrodynamic bearings, it still suffers from the disadvantage that rotational vibration increases when they are used in a horizontal position. In addition, since the clearance between a movable piece and a fixed piece of a radial bearing is of the order of microns, when two discrete radial bearings are used, it is difficult to align them concentrically. When two discrete thrust bearings are used, it is difficult to adjust the relative position between the thrust bearings. In addition, since the thrust collar, that is, movable piece, of a thrust bearing is produced so that the parallelism is within several microns, it is necessary to hold down the parallelism to about 1 micron when it is assembled, which is very difficult. In a radial gap type spindle motor wherein a rotor magnet member is disposed around the outer periphery of the stator coil with a radial gap provided therebetween, moment is generated due to the imbalance of radial magnetic force acting between the stator coil and the rotor magnet member, causing the axis of the rotor to be inclined with respect to the support shaft, which results in an increase in the starting torque because of local contact of the dynamic pressure surfaces. In rotation, unstable radial magnetic force causes whirling of the shaft and therefore makes it impossible to obtain a satisfactory operating condition.

It is an object of the present invention to provide a spindle motor which employs hydrodynamic bearings to improve the high-speed rotating performance and minimize the vibration irrespective of the position of the motor when used and which is therefore suitable for a high-recording capacity HDD.

The present invention provides a spindle motor which employs hydrodynamic bearings to improve the durability, clean operation and high-speed rotating performance and minimize vibrations when rotating irrespective of the position of the motor when used and which is therefore suitable for a high-recording capacity HDD.

SUMMARY OF THE INVENTION

The spindle motor of the present invention comprises a stator including a support shaft stood on a base, a cap-shaped rotor rotatably and concentrically disposed around the support shaft, thrust and radial bearings disposed between the stator and the rotor, a stator coil secured to the stator, and a rotor magnet member secured to the rotor in opposing relation to the stator coil. The thrust and radial bearings are hydrodynamic bearings.

The spindle motor of the present invention may be arranged such that a movable piece which constitutes a part of the thrust bearing is secured to the lower end of a cylindrical portion of the rotor and extended outwardly from the cylindrical portion, a fixed piece which constitutes another part of the thrust bearing is fixed to the base in opposing relation to the movable piece, the stator coil is secured to the outer peripheral portion of the support shaft above the radial bearing, and the rotor magnet member is secured to the inner peripheral surface of the rotor so that a radial gap is provided between the stator coil and the rotor magnet member.

The arrangement may also be such that the stator coil is secured to the outer peripheral portion of the support shaft above the radial bearing and the rotor magnet member is secured to the ceiling of the rotor so that an axial gap is provided between the stator coil and the rotor magnet member.

The present invention may be arranged such that the movable piece of the thrust bearing is secured to the lower end of the cylindrical portion of the rotor and extended inwardly from the cylindrical portion, the fixed piece of the thrust bearing is secured to the base in opposing relation to the movable piece. In this case, both the stator coil and the rotor magnet member may be disposed above the radial bearing, the rotor magnet member being secured to the ceiling of the rotor so that an axial gap is provided between the stator coil and the rotor magnet member.

The present invention may be arranged such that the movable piece of the thrust bearing is secured to the lower end of the cylindrical portion of the rotor and extended outwardly from the cylindrical portion, the fixed piece of the thrust bearing is secured to the base in opposing relation to the movable piece, and the rotor magnet member is disposed at a position which is inward of the movable piece of the thrust bearing. In this case, the stator coil may be secured to the base so that an axial gap is provided between the stator coil and the rotor magnet member. The stator coil may be secured to the lower part of the support shaft so that a radial gap is provided between the stator coil and the rotor magnet member.

The present invention may be arranged such that the thrust bearing is disposed above the radial bearing, and both the stator coil and the rotor magnet member are disposed below the radial bearing. In this case, the stator coil may be secured to the base so that an axial gap is provided between the stator coil and the rotor magnet member.

In the present invention, the thrust bearing may be preloaded by magnetic force which acts counter to the thrust dynamic pressure. Accordingly, in a spindle motor wherein a radial gap is provided between the stator coil and the rotor magnet member, the thrust bearing is preloaded in the counter direction to the thrust dynamic pressure by offsetting the axial magnetic force center of the rotor magnet member from the axial magnetic force center of the stator coil by a predetermined amount in a counter direction to the thrust dynamic pressure. The axial magnetic force centers of the rotor magnet member and the stator coil are defined as those that, when there is an axial distance between them, an axial magnetic force is generated between them to reduce the distance.

In the present invention, the radial bearing is disposed so as to bear the rotor over a predetermined range including the center of gravity of the rotor.

In the present invention, the fixed piece of the thrust bearing is secured to the base through a resilient pad, for example, silicone rubber. The movable piece of the thrust bearing is secured to the rotor through a resilient pad, for example, silicone rubber.

In the present invention, the opposing annular sliding surfaces of the fixed and movable pieces of the thrust bearing are made of a ceramic material, for example, silicon carbide, alumina, etc., and either of the annular sliding surfaces has spiral grooves for generating dynamic pressure.

In the present invention, the opposing cylindrical sliding surfaces of the fixed and movable pieces of the radial bearing are made of a ceramic material, for example, silicon carbide, alumina, etc., and either of the cylindrical sliding surfaces has herringbone-shaped grooves for generating dynamic pressure.

In the present invention, the movable piece of the radial bearing, the rotor and the movable piece of the thrust bearing may be arranged in an integral structure. In this case, the moving piece of the radial bearing and/or the moving piece of the thrust bearing in the integral structure is coated with a kind of material different from that of groundwork thereof, or the groundwork thereof is surface treated.

In the present invention, the fixed piece of the radial bearing, the support shaft, the fixed piece of the thrust bearing and the base may be arranged in an integral structure. In this case, the fixed piece of the radial bearing and/or the fixed piece of the thrust bearing in the integral structure is coated with a kind of material different from that of groundwork thereof, or the groundwork thereof is surface treated.

In the present invention, the rotor has a support member adapted to hold hard disks on the outer peripheral surface thereof.

In the spindle motor of the present invention, the support shaft may be extended through a through-hole provided in the upper end portion of the rotor and the distal end of the support shaft may be secured to a stationary part, thus the support shaft being loosely fitted in the through-hole.

In the spindle motor of the present invention, the upper end of the rotor may be closed and not pierced with the support shaft.

DETAILED DESCRIPTION OF THE PREFERRED EMBODIMENTS

Figure 1:
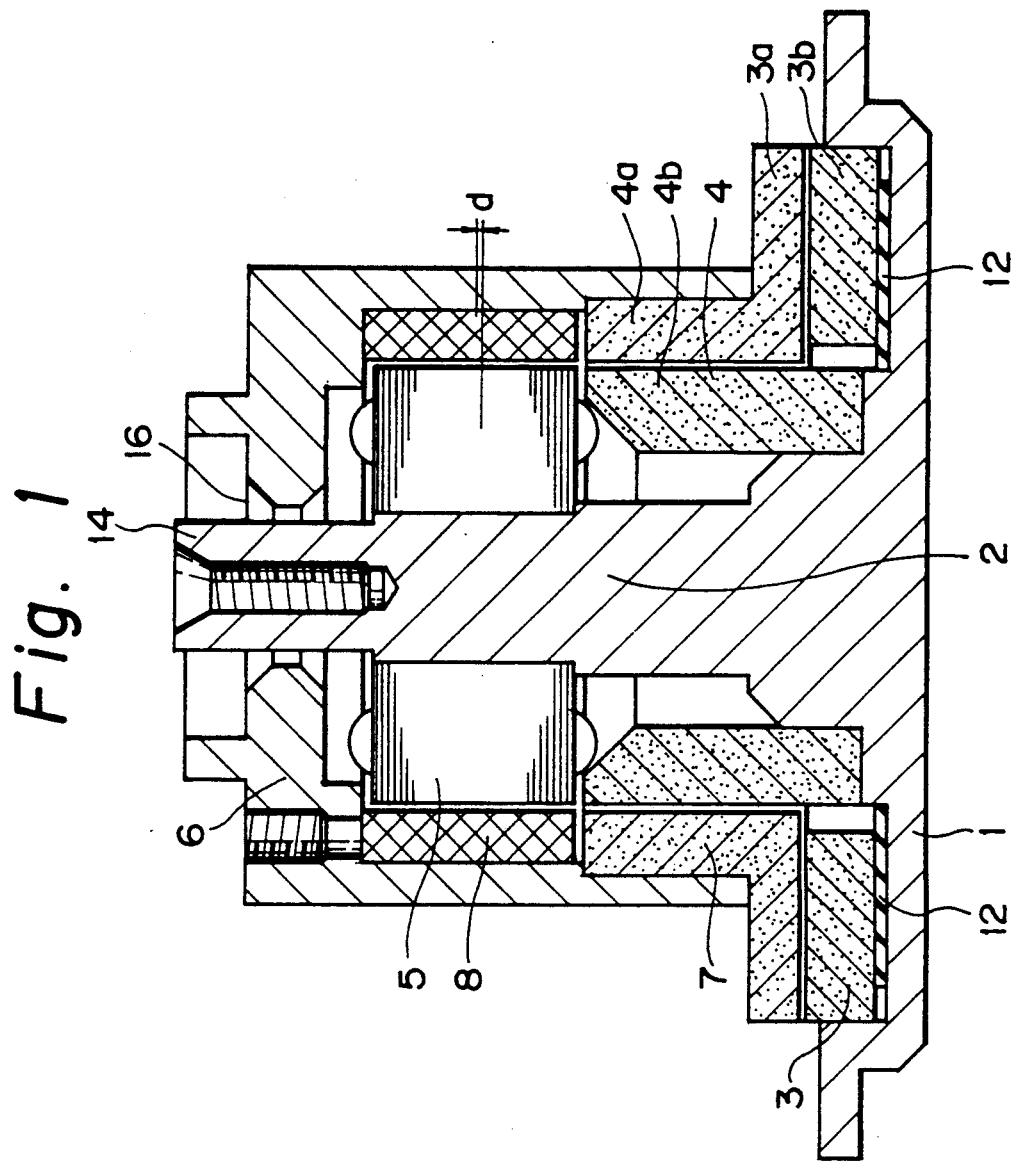
FIGS. 1 to 12 are sectional views respectively showing the structures of various embodiments of the spindle motor according to the present invention.

FIGS. 1 to 12 are sectional views respectively showing the structures of various embodiments of the spindle motor according to the present invention, in which the same reference numerals denote the same or corresponding portions.

Referring first to FIG. 1, which shows a first embodiment of the spindle motor according to the present invention, reference numeral 1 denotes a base, which has a support shaft 2 stood on the central portion thereof. A fixed piece 4b which constitutes a part of a radial bearing 4 is concentrically secured to the outer periphery of the support shaft 2. A stator coil 5 is secured to the support shaft 2 above the radial bearing 4. The stator coil 5 includes a plurality of electromagnetic coils equally spaced in the circumferential direction. A rotor 6 which serves as a hard disk supporting member has a cap-shaped configuration. The rotor 6 has a through-hole 16 provided in the upper end portion thereof. The upper end portion of the support shaft 2 extends through the through-hole 16. The distal end of the support shaft 2 may be secured to a stationary part (not shown). The upper end portion of the support shaft 2 is loosely fitted in the through-hole 16.

The rotor 6 has an annular bearing member 7 secured to the lower end portion thereof, the bearing member 7 having an L-shaped cross-sectional configuration. A rotor magnet member 8 is secured to the rotor 6 above the bearing member 7. The rotor magnet member 8 includes a plurality of magnets or iron cores equally spaced in the circumferential direction. The rotor magnet member 8 and the stator coil 5 face each other across a radial gap, thus constituting a drive part of the spindle motor.

The lower end portion of the bearing member 7 defines a movable piece 3a which constitutes a part of a thrust bearing 3. The movable piece 3a faces a fixed piece 3b which is secured to the base 1 to constitute another part of the thrust bearing 3. The inner peripheral surface of the bearing member 7 defines a movable piece 4a of the radial bearing 4. The movable piece 4a faces the fixed piece 4b of the radial bearing 4 that is secured to the support shaft 2.

Figure 13:
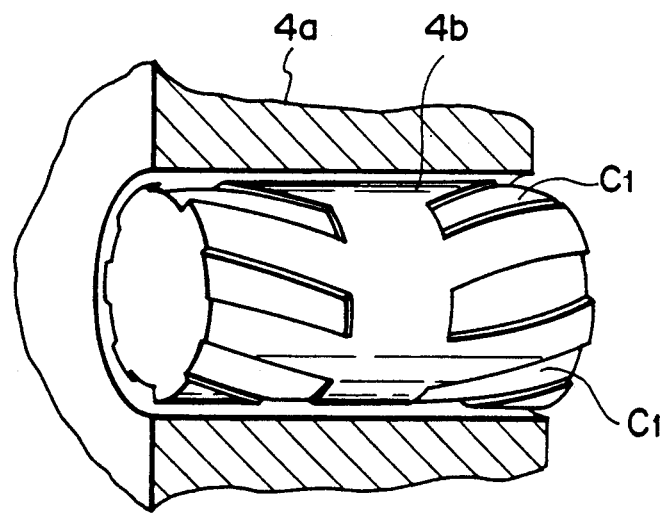
FIG. 13 schematically shows dynamic pressure generating grooves formed in a radial bearing member.

The opposing cylindrical sliding surfaces of the movable and fixed pieces 4a and 4b of the radial bearing 4 are made of a ceramic material, for example, silicon carbide, alumina, etc., and either of the sliding surfaces has herringbone-shaped grooves $C_1$ for generating dynamic pressure, such as those shown in FIG. 13, the other sliding surface being smoothed.

Figure 14:
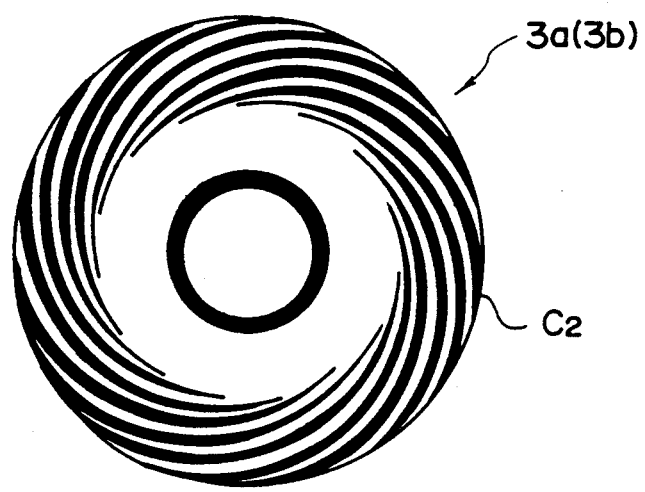
FIG. 14 schematically shows dynamic pressure generating grooves formed in a thrust bearing member.
Figure 15:
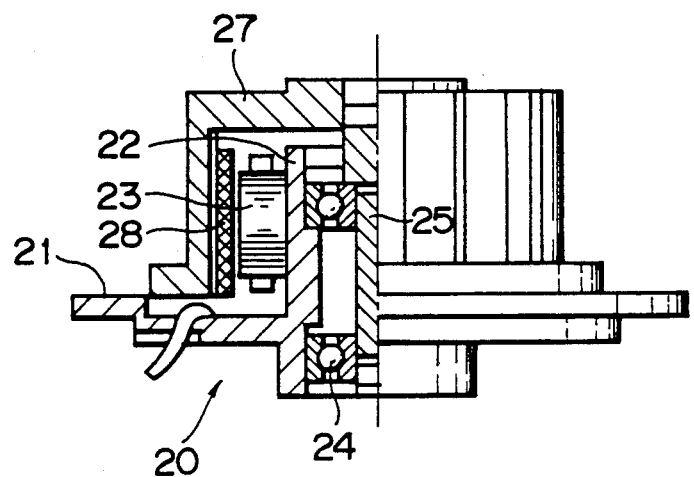
FIG. 15 is a partially sectioned elevational view of a conventional spindle motor for an HDD.
Figure 16:
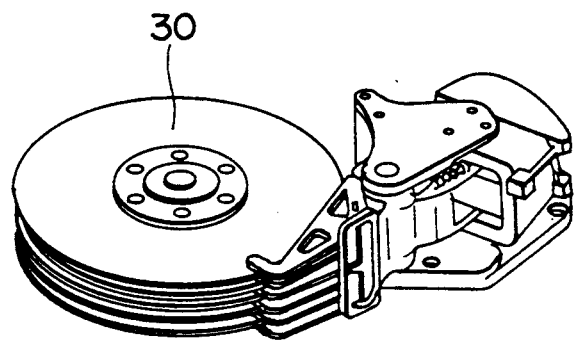
FIG. 16 is a perspective view of the conventional spindle motor when actually used in an HDD.

The opposing annular sliding surfaces of the movable and fixed pieces 3a and 3b of the thrust bearing 3 are made of a ceramic material, for example, silicon carbide, alumina, etc., and either of the annular sliding surfaces has spiral grooves $C_2$ for generating dynamic pressure, such as those shown in FIG. 14, the other sliding surface being smoothed. The sliding surfaces may be made of a member coated with a kind of material different from the groundwork thereof, or may be made of a member having a treated surface of degenerated groundwork thereof, instead of the ceramic material.

The rotor 6 is arranged such that a plurality of hard disks (not shown) can be mounted on the outer peripheral surface of the upper part of the rotor 6 through a spacer.

In the spindle motor shown in FIG. 1, as the electromagnetic coils that constitute the stator coil 5 are sequentially supplied with an electric current, the rotor 6 having the rotor magnet member 8 secured thereto begins to rotate and consequently a hydrodynamic pressure is generated between the opposing annular sliding surfaces of the movable and fixed pieces 3a and 3b of the thrust bearing 3, thus forming a hydrodynamic thrust bearing. Similarly, a hydrodynamic pressure is generated between the opposing cylindrical sliding surfaces of the movable and fixed pieces 4a and 4b of the radial bearing 4, thus forming a hydrodynamic radial bearing.

Since the rotor 6 is supported in such a manner that the lower end and inner peripheral surfaces of the bearing member 7 are not in solid contact with the fixed piece 3b of the thrust bearing 3 and the fixed piece 4b of the radial bearing 4, the spindle motor is capable of smoothly rotating at high speed. Accordingly, the spindle motor of the present invention is free from the problem of friction and vibration in contrast to the prior art that employs ball bearings to support the rotor.

Some or all of the following elements, i.e., the base 1, the support shaft 2, the fixed piece 4b of the radial bearing 4 and the fixed piece 3b of the thrust bearing 3, may be formed in an integral structure from the same constituent material. The movable piece 4a of the radial bearing 4 and the movable piece 3a of the thrust bearing 3 are formed in an integral structure of the bearing member 7 having an L-shaped cross section. The rotor 6 and the bearing member 7 may be formed in an integral structure from the same constituent material.

Since the thrust bearing 3 is disposed outside the motor driving part that comprises the rotor magnet member 8 and the stator coil 5, if the dynamic pressure generating grooves $C_2$ are formed so that the dynamic pressure generated will act inwardly, air is sucked in from the outer peripheral side of the thrust bearing 3 and no air flows outward from the lower end portion of the rotor 6. No dust will therefore be scattered outwardly from the rotor magnet member 8 and the stator coil 5. Accordingly, the spindle motor of the present invention is suitable for use in an environment where dust must be kept out. In an environment where there is no particular need to used dust out, the dynamic pressure generating grooves may be formed so that dynamic pressure generated will act outwardly of the thrust bearing 3.

In the spindle motor of the first embodiment shown in FIG. 1, a radial gap is provided between the rotor magnet member 8 and the stator coil 5, and the magnetic force center of the axial length of the rotor magnet member 8 is a distance d offset from the magnetic force center of the axial length of the stator coil 5, so that a magnetic force acts so as to make the center of the rotor magnet member 8 coincident with the center of the stator coil 5, thus enabling the thrust bearing 3 to be preloaded. The magnitude of the preload can be set at a desired value by varying the distance d.

The spindle motor shown in FIG. 1 may be arranged in the form of a synchronous motor by comprising the rotor magnet member 8 of a group of rotor magnets, and may also be arranged in the form of an induction motor by comprising the rotor magnet member 8 of a group of rotor cores.

Since the bearing member 7 that constitutes the movable pieces 4a and 3a of the radial and thrust bearings 4 and 3 rotates relative to the fixed pieces 3b and 4b, without contacting the latter, through a fluid which is compressed when the bearing member 7 rotates, these members that constitute the radial and thrust bearing 4 and 3 may be made of any kind of material as long as it can be machined with a high degree of accuracy. Any of generally employed metallic materials and organic materials may be utilized. The point is that it is necessary to minimize the frictional resistance and wear of the bearing members at the time when the motor is started and rotating at low speed. The range of usable materials therefore depends upon the bearing structure adopted.

In the first embodiment shown in FIG. 1, the size of each of the radial and thrust bearings 4 and 3 is increased to reduce the surface pressure acting on the contact surfaces and the stator coil 5 is properly disposed to attain a structure which is free from any local contact. Accordingly, if the members that constitute the bearings are made of, for example, a stainless steel, and a thin coat of lubricant is applied to the contact surfaces, it is possible to maintain a stable performance for a long period of time. However, no lubricant or only minimal lubricant can be used in certain environments where the spindle motor is used. In such a case, it is preferable to employ a material which is superior in wear-resistant and sliding properties, particularly a ceramic material. Silicon carbide or alumina is particularly suitable for such an application.

Since the clearance between the movable and fixed pieces of each of the thrust and radial bearings 3 and 4 is of a small value in the order of microns, the thrust bearing 3 is preferably disposed exactly at right angles with respect to the radial bearing 4. It is, however, difficult to dispose it exactly at right angles because of the limitation on the degree of accuracy with which the bearings are produced. For this reason, a resilient pad 12 which is made of a resilient material is interposed between the fixed piece 3b of the thrust bearing 3 and the base 1 to absorb any error in the perpendicularity. Any flexible and durable material may be employed to form the resilient pad 12. However, silicone rubber is suitable from the viewpoint of both flexibility and durability.

In the first embodiment, the support shaft 2 is extended through the through-hole 16 provided in the upper end portion of the rotor 6 and the distal end of the support shaft 2 may be secured to a stationary part (not shown). In such a case, the support shaft 2 is supported at both ends by the base 1 and the stationary part and it is therefore possible to prevent deflection of the support shaft 2 which would otherwise be caused by the weight of the load attached to the rotor 6 when the spindle motor is used in a horizontal position. The structure in which the support shaft 2 is supported at both ends is advantageous for use in a large-sized spindle motor.

The radial hydrodynamic bearing 4 that comprises the movable and fixed pieces 4a and 4b is sufficiently long to cover the range of from the lower end of the support shaft 2 to the center of gravity G of a rotary assembly comprising the rotor 6 and hard disks mounted thereon. As the length of the radial hydrodynamic bearing 4 increases, the effective working pressure range within which sufficient load carrying capacity is provided increases, and the radial vibration decreases. Further, since the radial hydrodynamic bearing 4 is not formed in a cantilever structure, the starting torque is minimized. Since the radial hydrodynamic bearing 4 is long and a large dynamic pressure is therefore generated, the movable and fixed pieces 4a and 4b of the radial bearing 4 is not required to be machined to any particularly high degree of accuracy.

When the spindle motor is used in a vertical position, the range of preload applied in the thrust direction by the magnetic force from the rotor magnet member 8 depends on the dynamic pressure generated between the movable and fixed pieces 3a and 3b of the thrust bearing 3, the weight of the rotor 6 that is applied to the thrust bearing 3 and the machining accuracy of the movable and fixed pieces 3a and 3b of the thrust bearing 3. However, it is, basically, only necessary to satisfy the following relationship:

$$P < 100 \times S^2 - W \quad (1)$$

wherein P: the preload [g] applied by the rotor magnet member 8; S: the area [cm$^2$] of the thrust bearing 3; and W: the weight [g] of the rotor 6. In the above relationship, $100 \times S$ is the dynamic pressure [g/cm$^2$] required for the rotor to rotate without solid contact through a hydrodynamic bearing finished by an existing, economical finishing process.

In the first embodiment, since the thrust bearing 3 is disposed outside the lower end of a cylindrical portion of the rotor 6, that is, the driving part comprising the rotor magnet member 8 and the stator coil 5, the diameter of the thrust bearing 3 increases, and the rotor 6 is pulled by the above-described preload toward the thrust bearing 3 having a relatively large diameter. Accordingly, the radial deflection of the rotor 6 decreases, and stable rotation of the rotor 6 is achieved.

Figure 2:
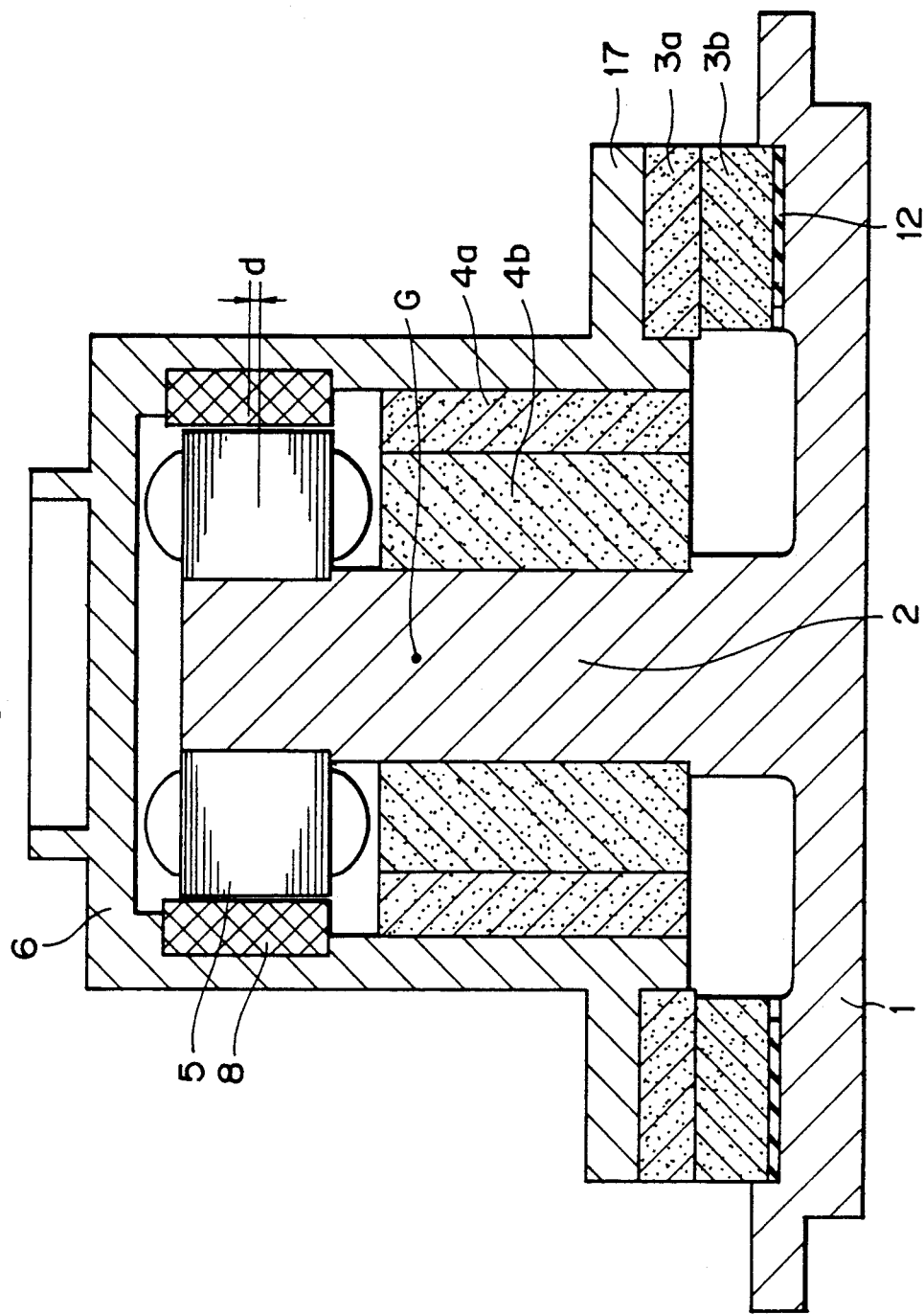

FIG. 2 is a sectional view showing the structure of a second embodiment of the spindle motor according to the present invention, which is similar to the first embodiment shown in FIG. 1 but different therefrom in the following point. In the second embodiment, the upper end of the rotor 6 is closed and not pierced by the support shaft 2. In addition, a member which corresponds to the annular bearing member 7 having an L-shaped cross-sectional configuration, shown in FIG. 1, is split into a radial bearing sleeve, that is, a movable piece 4a of a radial bearing, and a thrust bearing collar, that is, a movable piece 3a of a thrust bearing. The movable piece 4a of the radial bearing is secured to the inner peripheral surface of the rotor 6 in opposing relation to the fixed piece 4b of the radial bearing. The movable piece 3a of the thrust bearing is secured to the lower surface of a collar portion 17 formed at the lower end of the rotor 6, the movable piece 3a facing the fixed piece 3b of the thrust bearing.

When the spindle motor of the first or second embodiment is used in a horizontal position, if no preload is applied in the thrust direction by magnetic force, the weight of the rotor 6 is not applied to the thrust bearing 3. Accordingly, an inclination of the support shaft 2 with respect to the radial bearing causes local contact of the bearing members. When the thrust bearing 3 starts to generate a dynamic pressure in such a state, the rotor 6 is sprung out in the thrust direction and is therefore unable to rotate stably. It is therefore preferable to apply in advance a force to the thrust bearing 3 in a counter direction to the dynamic pressure generated from the thrust bearing 3, that is, to preload the thrust bearing 3, by previously offsetting the magnetic force center of the rotor magnet member 8, which constitutes the drive part of the spindle motor, from the axial magnetic force center of the stator coil 5 by a distance d in the direction in which the rotor magnet member 8 comes away from the annular thrust bearing 3.

Figure 3:
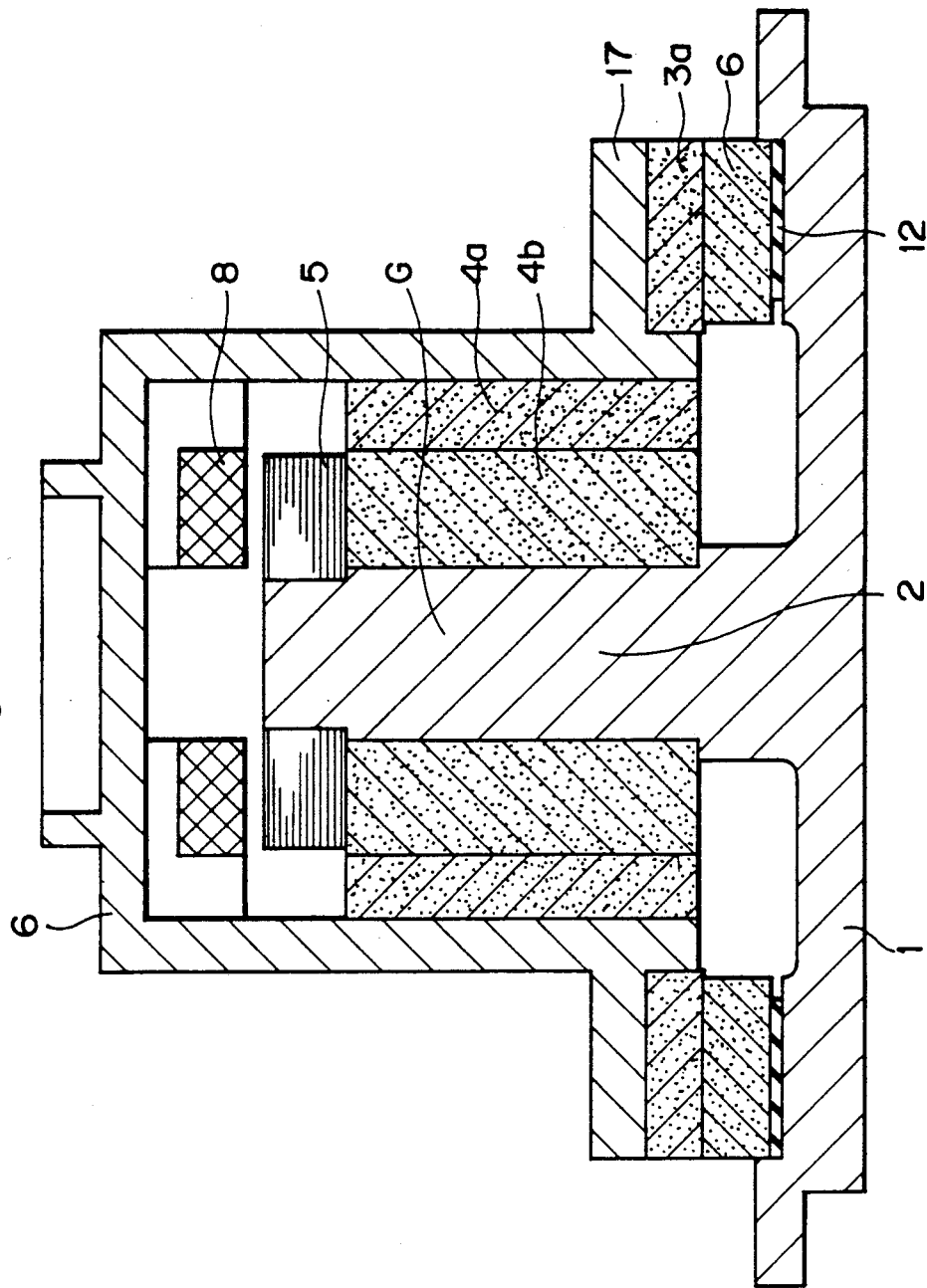

FIG. 3 is a sectional view showing the structure of a third embodiment of the spindle motor according to the present invention, which is similar to the embodiment shown in FIG. 2 but different therefrom in the following point. In this spindle motor, the rotor magnet member 8 is disposed on the ceiling of the rotor 6. The stator coil 5 comprises a plurality of electromagnetic coils which are secured at equal spacings to the outer periphery of the support shaft 2 above the fixed piece 4b of the radial bearing 4. Whereas the spindle motors shown in FIGS. 1 and 2 are of the radial gap type, the spindle motor shown in FIG. 3 is of the thrust gap type.

In contrast to the radial gap type spindle motors, the thrust gap type spindle motor is free from the moment which would otherwise be generated due to the imbalance in radial magnetic force acting between the stator coil and the rotor magnet member, and the vibration of the motor when rotating is therefore reduced.

Figure 4:
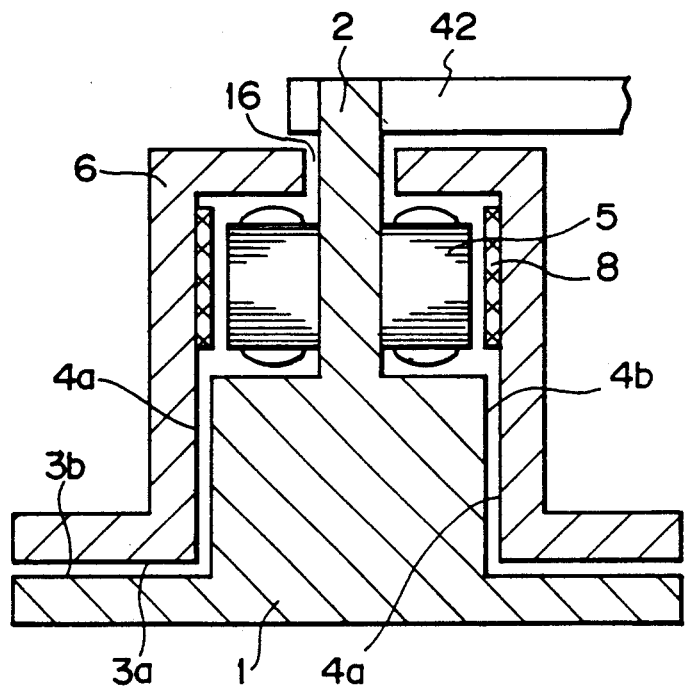

FIG. 4 shows the structure of a fourth embodiment of the spindle motor according to the present invention, which is similar to the embodiment shown in FIG. 1 but different therefrom in the following point. In the spindle motor shown in FIG. 4, the base 1, the support shaft 2, the fixed piece 4b of the radial bearing and the fixed piece 3b of the thrust bearing are formed in an integral structure from the same constituent material. Similarly, the rotor 6, the movable piece 4a of the radial bearing and the movable piece 3a of the thrust bearing are formed in an integral structure from the same constituent material. The support shaft 2 is extended through a through-hole 16 provided in the upper end portion of the rotor 6, and the distal end of the support shaft 2 is secured to a stationary part 42. Either one or both of the moving and fixed pieces of the radial and thrust bearings in the fourth embodiment may be coated with thin film of a kind of material different from that of groundwork thereof, or may be provided with a treated surface layer of degenerated groundwork thereof. The thin film may be made, e.g. by way of physical vapor deposition or chemical vapor deposition, or by way of plating with a kind of material different from the groundwork thereof. The treated surface layer may be made, e.g. by way of oxidation, nitriding, or ion implantation with the groundwork of the pieces.

Figure 5:
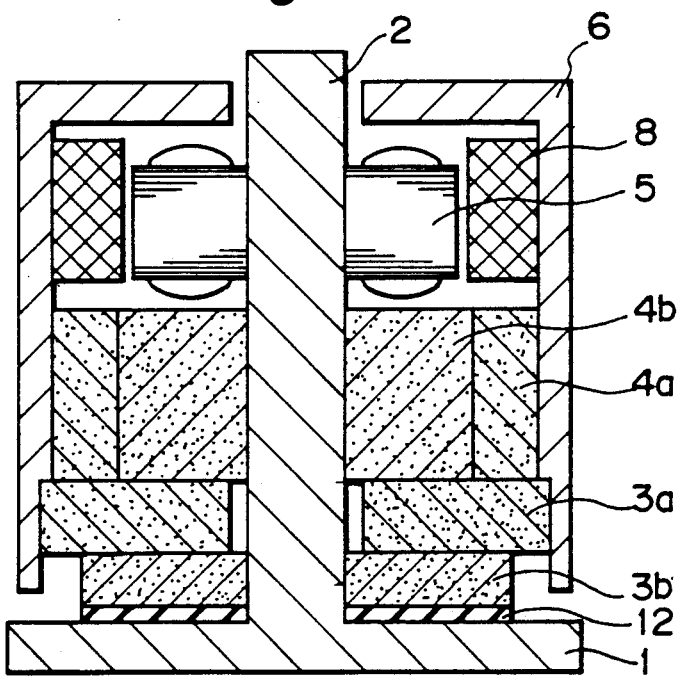

FIG. 5 shows the structure of a fifth embodiment of the spindle motor according to the present invention, which is similar to the embodiment shown in FIG. 1 but different therefrom in the following point. In this embodiment, a thrust bearing 3 which has relatively small diameter is disposed below a radial bearing 4. A member which corresponds to the bearing member 7 having an L-shaped cross-sectional configuration, shown in FIG. 1, is split into a movable piece 4a of the radial bearing 4 and a movable piece 3a of the thrust bearing 3. The movable piece 4a of the radial bearing 4 is secured to the inner peripheral surface of the rotor 6 in opposing relation to a fixed piece 4b of the radial bearing 4 which is secured to the support shaft 2. The movable piece 3a of the thrust bearing 3 is secured to the inner peripheral surface of the lower end portion of the rotor 6 in opposing relation to a fixed piece 3b of the thrust bearing 3 which is secured to the base 1 through a resilient pad 12.

In the fifth embodiment, a motor driving part which comprises a stator coil 5 and a rotor magnet member 8 is disposed above the radial bearing 4. The stator coil 5 is secured to the outer periphery of the support shaft 2 above the radial bearing 4, and the rotor magnet member 8 is secured to the inner peripheral surface of the rotor 6 in opposing relation to the stator coil 5.

Figure 6:
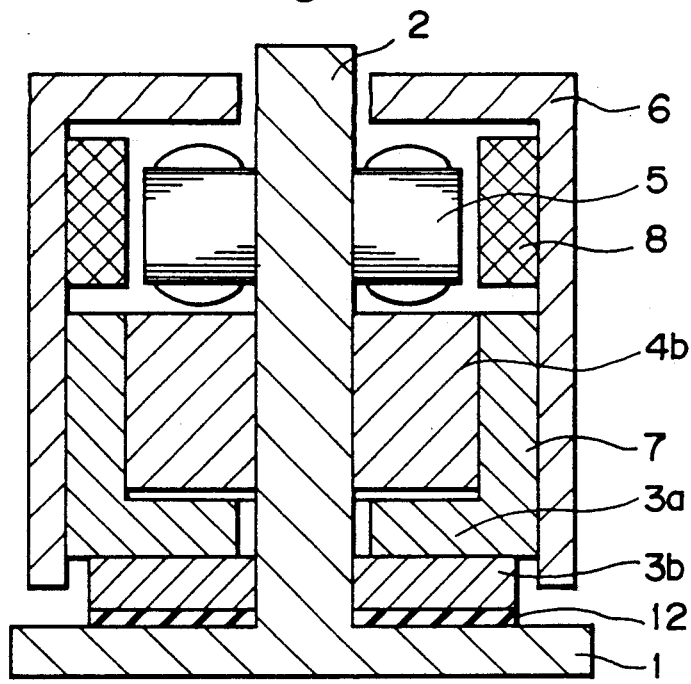

FIG. 6 shows the structure of a sixth embodiment of the spindle motor according to the present invention, which is similar to the embodiment shown in FIG. 5 but different therefrom in the following point. In the sixth embodiment, the movable pieces 3a and 4a of the thrust and radial bearings 3 and 4 are joined together in the form of an integral bearing member 7. This structure facilitates assembly of the bearings.

Figure 7:
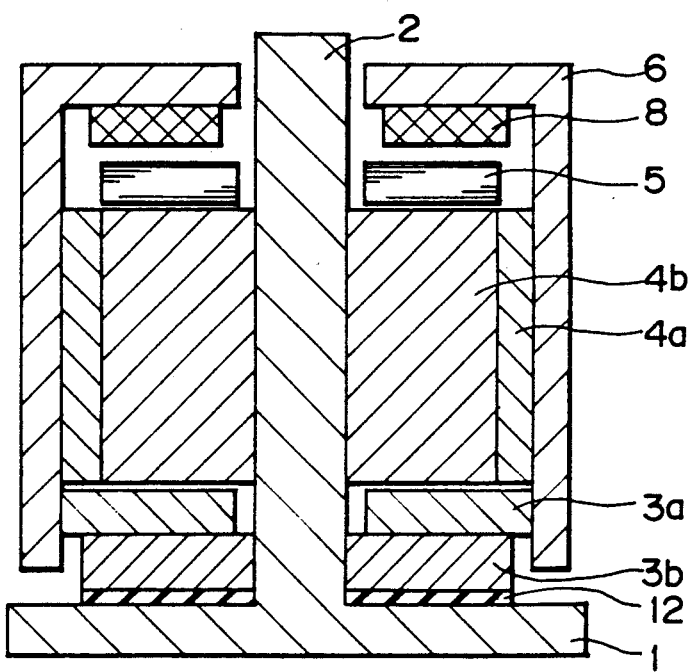

FIG. 7 shows the structure of a seventh embodiment of the spindle motor according to the present invention, which is similar to the embodiment shown in FIG. 5 but different therefrom in the following point. In the seventh embodiment, the motor drive part comprises a rotor magnet member 8 which is secured to the ceiling of the rotor 6 and a stator coil 5 which is secured to the upper end of the fixed piece 4b of the radial bearing, thus forming a so-called thrust gap motor in which an axial gap is provided between the rotor magnet member 8 and the stator coil 5. It should be noted that, in this embodiment also, the movable pieces 3a and 4a of the thrust and radial bearings 3 and 4 may be joined together in the form of an integral bearing member in the same way as in the spindle motor shown in FIG. 6.

In any of the spindle motors shown in FIGS. 5 to 7, the thrust bearing 3 is formed inwardly of the outer periphery of the rotor 6 and it is therefore possible to minimize the size of the base 1, obtain a compact spindle motor and hence reduce the installation area. In the case of a large-sized spindle motor of 5 to 8 inches level in diameter, the diameter and area of the thrust bearing can be increased even if it is disposed inwardly of the outer periphery of the rotor 6, and it is possible to obtain stable rotation of the rotor 6 by preloading the thrust bearing 3 by magnetic force in a counter direction to the dynamic pressure generated from the thrust bearing 3. In these embodiments also, the spindle motors are not necessarily limited to synchronous motors wherein the rotor magnet member comprises magnets but may be arranged in the form of induction motors wherein the rotor magnet member comprises iron cores, as in the embodiments shown in FIGS. 1 to 4.

Figure 8:
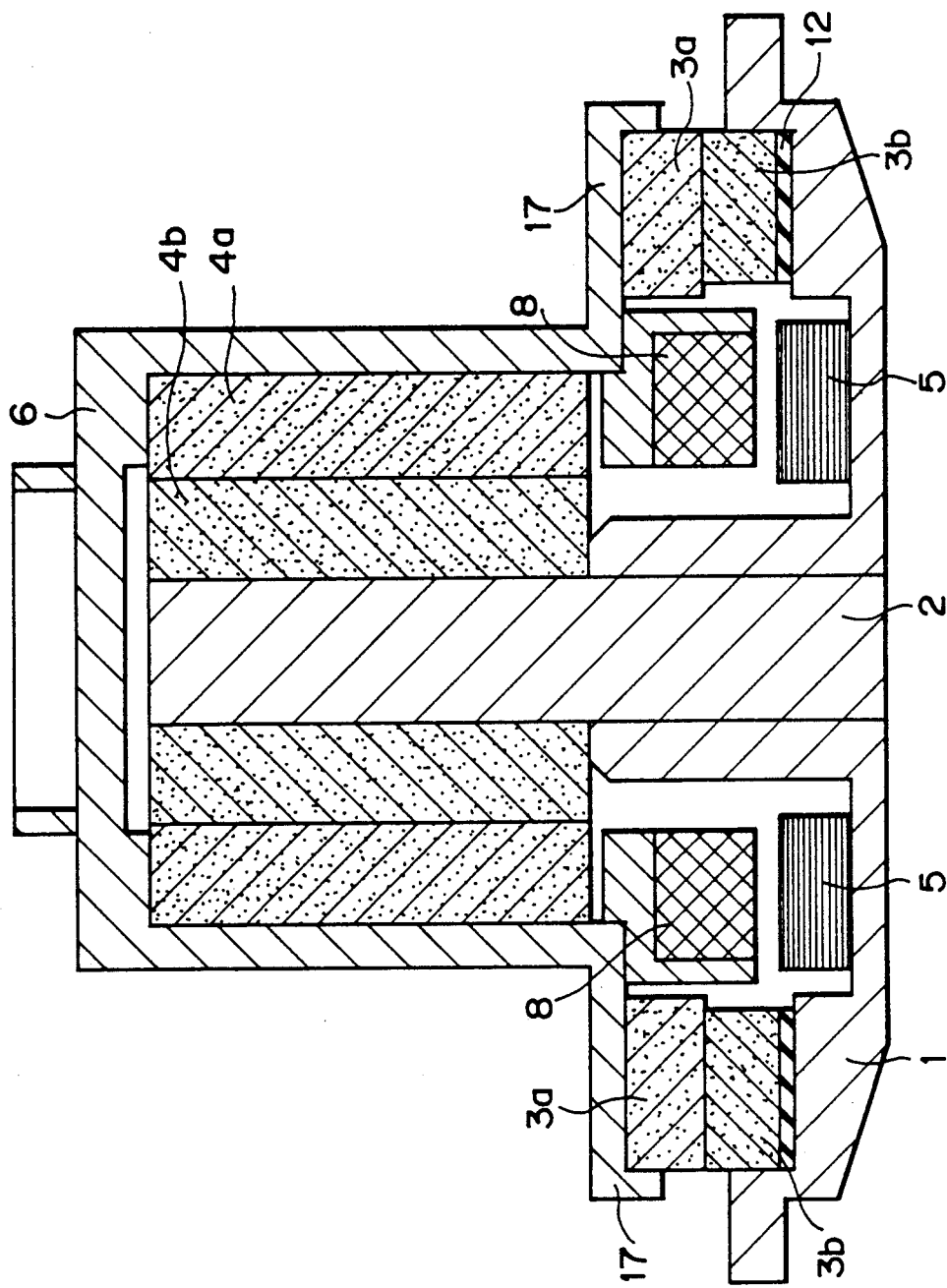

FIG. 8 shows an eighth embodiment of the spindle motor according to the present invention. A fixed piece 4b of a radial bearing 4 is secured to the outer periphery of the upper part of the support shaft 2, and a movable piece 4a of the radial bearing 4 is secured to the inner periphery of a cap-shaped rotor 6. The rotor 6 has a horizontally extending collar portion 17 formed at the lower end thereof. A movable piece 3a of a thrust bearing 3 is secured to the lower surface of the collar portion 17, and a fixed piece 3a of the thrust bearing 3 is secured to a base 1 in opposing relation to the movable piece 3a.

A rotor magnet member 8 is secured to the rotor 6 at a position which is inward of the movable piece 3b of the thrust bearing 3. A stator coil 5 is secured to the base 1 in opposing relation to the rotor magnet member 8. The rotor magnet member 8 and the stator coil 5 has an axial gap therebetween, thereby forming a thrust gap motor.

The rotor 6 is arranged such that hard disks can be mounted on the outer peripheral portion of the rotor 6, and the thrust and radial bearings 3 and 4 are hydrodynamic bearings, in the same way as shown in the embodiment in FIG. 1.

In this embodiment, the fixed piece 4b of the radial bearing and the support shaft 2 may be formed in an integral structure, and the movable piece 4a of the radial bearing 4 and the rotor 6 may also be formed in an integral structure. Further, the movable piece 3a of the thrust bearing 3 and the collar portion 17 of the rotor 6 may be formed in an integral structure, and the fixed piece 3b of the thrust bearing 3 and the base 1 may also be formed in an integral structure.

In this embodiment, the length of the radial bearing 4 may be made substantially the same as the height of the rotor 6, thus, the radial bearing 4 can be increased. Such an arrangement enables enlargement of the effective dynamic pressure range within which sufficient load carrying capacity is provided, and hence permits minimization of the radial vibration. Since the radial bearing 4 is not formed in a cantilever structure, the starting torque is minimized. In addition, the radial bearing 4 is not required to be machined to any particularly high degree of accuracy. However, the length of the radial bearing 4 may be smaller than the height of the rotor 6.

When the spindle motor of this embodiment is used in a vertical position, the range of preload is the same as that expressed by the relationship (1) described above. When the spindle motor is used in a horizontal position, stable rotation is obtained if the rotor magnet member 8 is utilized to generate a force acting counter to the dynamic pressure to thereby subject the thrust bearing 3 to a force counter to the dynamic pressure, that is, preload the thrust bearing 3.

In this embodiment, the thrust bearing 3 is disposed outside the drive part and hence has a relatively large diameter, so that stable rotation is obtained. By sucking in air from the outer peripheral side of the thrust bearing 3, it is possible to prevent dust from scattering outwardly from the rotor magnet member 8 and the stator coil 5.

In a circumstances where dust causes no problem, it is, of course, possible to form the dynamic pressure generating grooves so as to generate dynamic pressure at the outside of the thrust bearing.

In the embodiment shown in FIG. 8, the size of each of the radial and thrust bearings 4 and 3 is increased to reduce the surface pressure acting on the contact surfaces, and the stator coil 5 is properly disposed to attain a structure which is free from local contact. Accordingly, if the members that constitute the bearings are made of, for example, a stainless steel, and a thin coat of lubricant is applied to the contact surfaces, it is possible to maintain a stable performance for a long period of time. When it is not possible to use any lubricant or the thickness of lubricant should be minimized if any, it is preferable to employ a ceramic material which is superior wear-resistant and low friction properties, particularly silicon carbide or alumina. In this spindle motor, a resilient pad 12 is interposed between the fixed piece 3b of the thrust bearing 3 and the base 1 to absorb any error in the perpendicularity between the thrust and radial bearings 3 and 4, and the force to preload the thrust bearing 3 can be obtained from the driving part, since the driving part is a thrust gap type.

Figure 9:
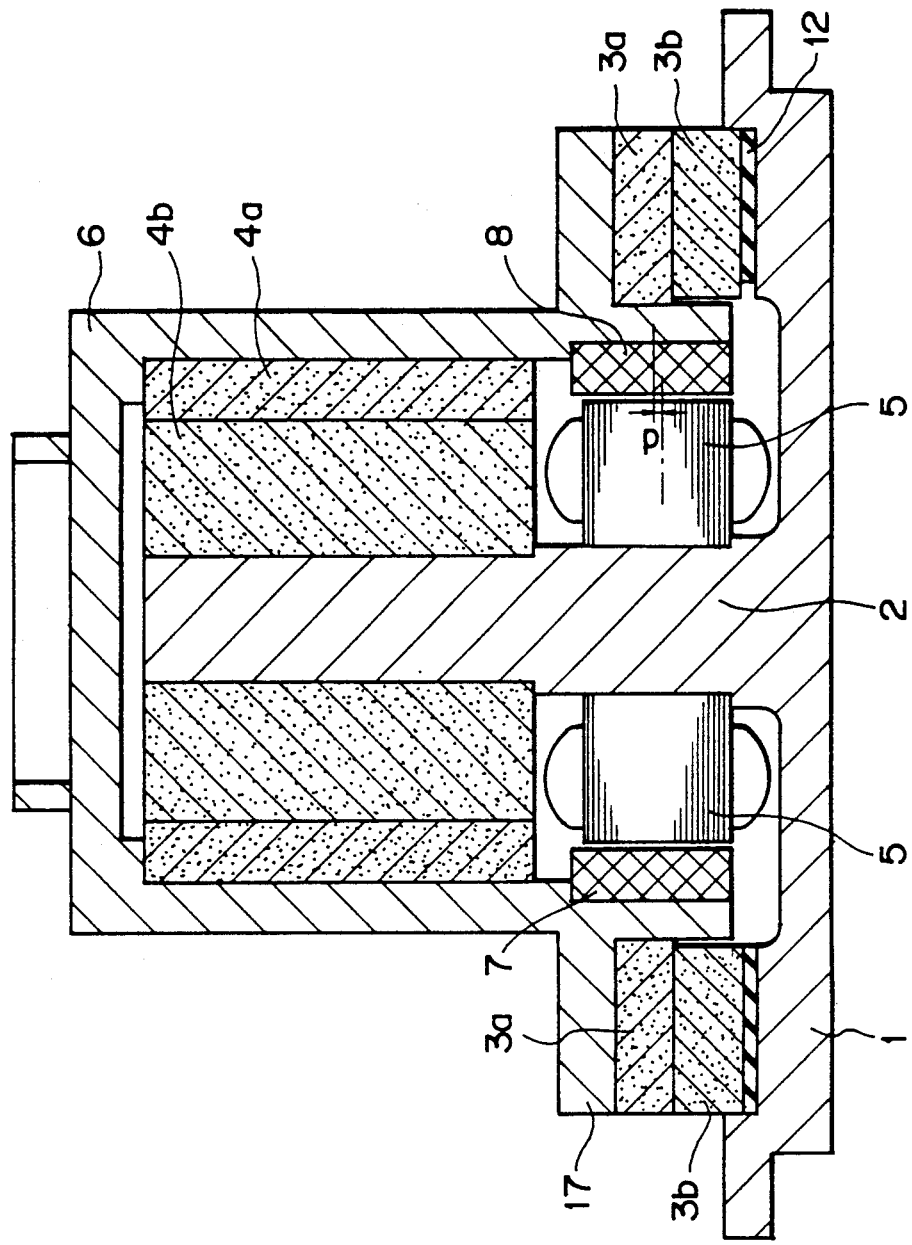

FIG. 9 shows a ninth embodiment of the spindle motor according to the present invention, which is similar to the embodiment shown in FIG. 8 but different therefrom in the following point. In the spindle motor shown in FIG. 9, the rotor magnet member 8 is secured to the inner peripheral of the lower part of the rotor 6 and the stator coil 5 is secured to the lower part of the support shaft 2, thereby forming a radial gap type motor. In the embodiment shown in FIG. 9, the center of the axial length of the stator coil 5 and that of the rotor magnet member 8 are offset from each other by a distance d, thereby enabling the thrust bearing 3 to be preloaded. The magnitude of the preload can be set at a desired value by varying the distance d.

Figure 10:
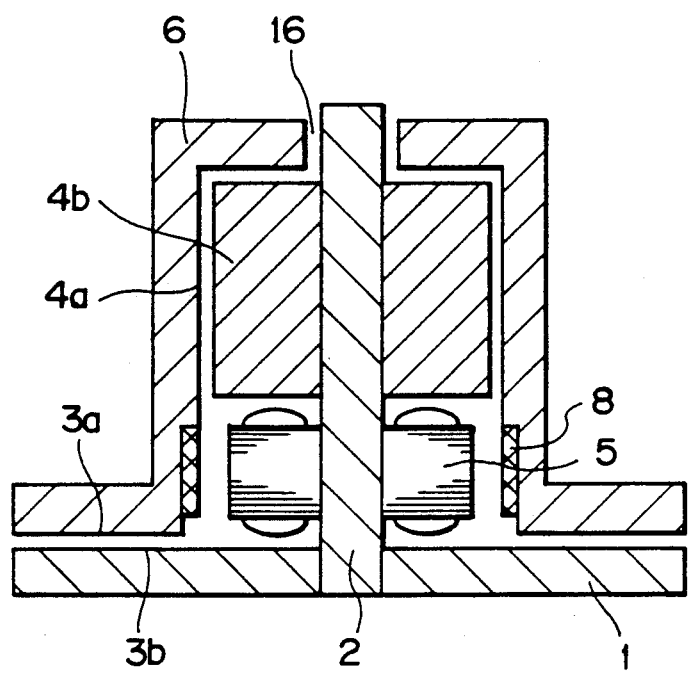

FIG. 10 shows the structure of a tenth embodiment of the spindle motor according to the present invention, which is similar to the embodiment shown in FIG. 9 but different therefrom in the following point. In this embodiment, the base 1 and the fixed piece 3b of the thrust bearing 3 are formed in an integral structure from the same constituent material, and the movable piece 3a of the thrust bearing 3, the rotor 6 and the movable piece 4a of the radial bearing 4 are formed in an integral structure from the same constituent material. The support shaft 2 is extended through a through-hole 16 which is provided in the upper end portion of the rotor 6, and the distal end of the support shaft 2 is secured to a stationary part (not shown). Since the support shaft 2 is supported at both ends by the base 1 and the stationary part, when the spindle motor is used in a horizontal position, it is possible to prevent deflection of the support shaft 2 which would otherwise be caused by the weight of the disks attached to the rotor 6. The arrangement what the support shaft 2 is supported at both ends is advantageous for use in a large-sized spindle motor.

Figure 11:
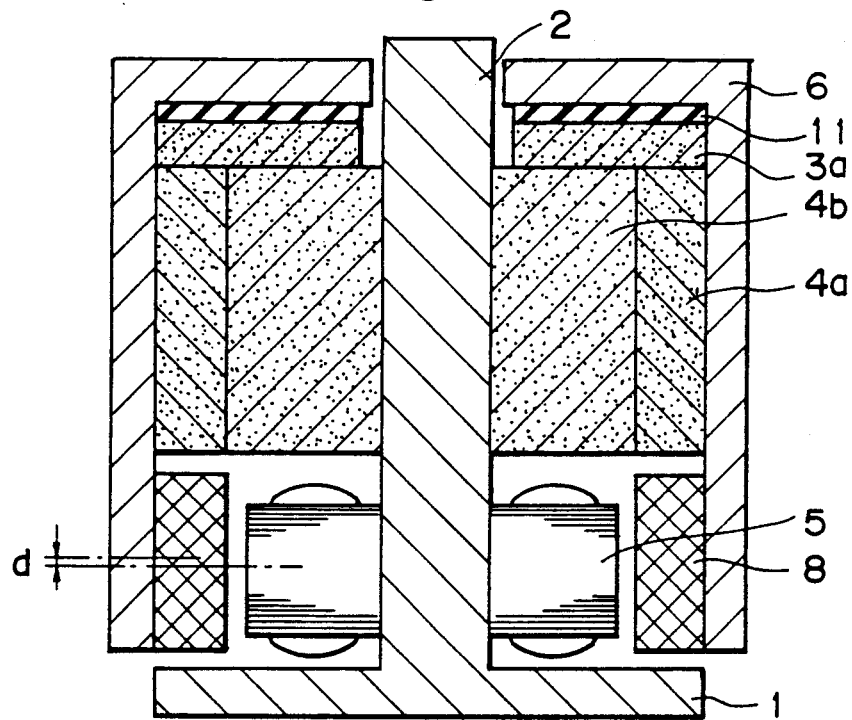

FIG. 11 shows the structure of an eleventh embodiment of the spindle motor according to the present invention. In this embodiment, a thrust bearing 3 which has a relatively small diameter is disposed between the upper end of a support shaft 2 and a cap-shaped rotor 6. A movable piece 3a of the thrust bearing 3 is secured to the inner surface of the upper part of the rotor 6 through a resilient pad 11. A movable piece 4a of a radial bearing 4 is secured to the inner peripheral surface of the rotor 6 below the movable piece 3a of the thrust bearing 3. A fixed piece 4b of the radial bearing 4 is concentrically secured to the outer peripheral surface of the upper part of the support shaft 2. The outer peripheral surface of the fixed piece 4b of the radial bearing 4 faces the inner peripheral surface of the movable piece 4a of the radial bearing 4. The upper end face of the fixed piece 4b defines a fixed piece 3b of the thrust bearing 3. The opposing cylindrical sliding surfaces of the movable and fixed pieces 4a and 4b of the radial bearing 4 are made of a ceramic material, and either of the cylindrical sliding surfaces has herringbone-shaped grooves $C_1$ for generating dynamic pressure, such as those shown in FIG. 13. Either of the opposing annular sliding surfaces of the movable and fixed pieces 3a and 3b of the thrust bearing 3 has spiral grooves $C_2$ for generating dynamic pressure, such as those shown in FIG. 14.

In the embodiment shown in FIG. 11, a stator coil 5 is secured to the support shaft 2 below the fixed piece 4b of the radial bearing 4. A rotor magnet member 8 is secured to the inner peripheral surface of the lower part of the rotor 6. The stator coil 5 and the rotor magnet member 8 has a radial gap therebetween to constitute a radial gap motor. By offsetting the axial center of the rotor magnet member 8 from that of the stator coil 5 by a distance d, the thrust bearing 3 is preloaded.

In the spindle motor structure of the embodiment shown in FIG. 11, the length of the radial bearing 4 can be increased and the dynamic pressure can therefore be increased, thereby enabling the spindle motor to operate with sufficient load carrying capacity, and thus permitting minimization of radial vibration. In addition, since the radial bearing 4 is not formed in a cantilever structure, the starting torque is minimized, and since a relatively high dynamic pressure is generated, the radial bearing 4 is not required to be machined to any particularly high degree of accuracy. When used in a horizontal position, the spindle motor is capable of stable rotation by virtue of the preload applied to the thrust bearing 3.

Figure 12:
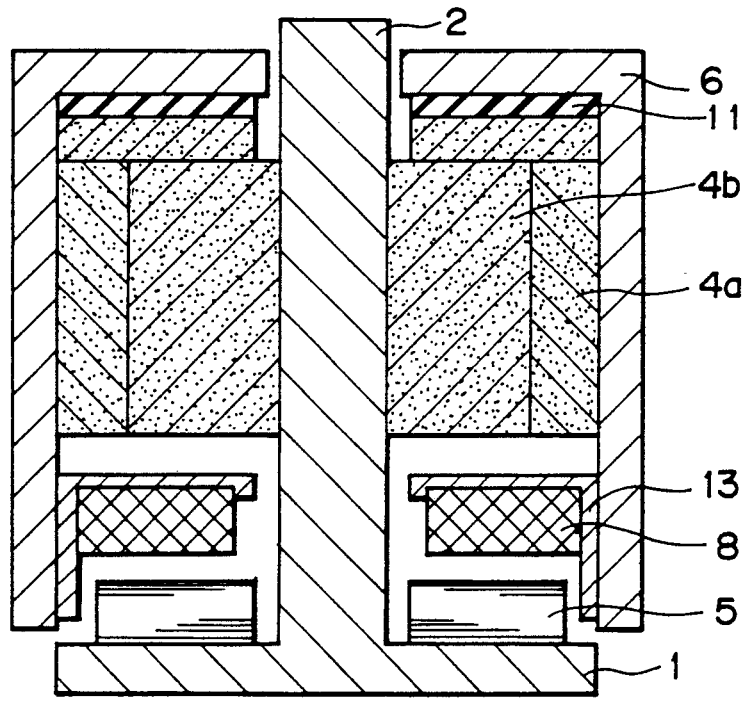

FIG. 12 shows the structure of a twelfth embodiment of the spindle motor according to the present invention, which is similar to the embodiment shown in FIG. 11 but different therefrom in the following point. In this embodiment, the stator coil 5 is secured to the upper surface of the base 1. The rotor magnet member 8 is secured to a bracket 13 which is secured to the inner peripheral surface of the lower part of the rotor 6. The stator coil 5 and the rotor magnet member 8 have an axial gap therebetween to constitute a thrust gap motor. In the embodiment shown in FIG. 12, the magnetic force acting between the stator coil 5 and the rotor magnet member 8 can be utilized to preload the thrust bearing 3 in the counter direction to the dynamic pressure generated therefrom.

The spindle motor of the present invention provides the following advantageous effects:

(1) Since the constituent members of the radial bearing are formed to be integral with the associated constituent members of the spindle motor, alignment effected at the time of assembling is facilitated. In addition, it is easy to carry out precise machining of the radial bearing itself.

(2) Since the radial bearing is made relatively long to bear the rotor over a predetermined range which includes at least the center of gravity of the rotor, the spindle motor is capable of operating with sufficient load carrying capacity. Accordingly, the dynamic pressure increases and the radial vibration is minimized. Since the constituent members of the radial bearing are not required to be machined to any particularly high degree of accuracy, the product cost lowers.

(3) By disposing the thrust bearing at the outer periphery of the rotor, it is possible to increase both the diameter and area of the thrust bearing and hence obtain a high dynamic pressure. In addition, by magnetically preloading the thrust bearing in the thrust direction, the inclination of the support shaft with respect to the radial bearing is corrected and the rotor is capable of stably rotating without being sprung out by the dynamic pressure applied thereto in the thrust direction. In particular, even when the spindle motor is used in a horizontal position, the rotor rotates stably by virtue of the cooperation of the elongated radial bearing and the preload applied to the thrust bearing.

(4) By forming the thrust bearing at a position which is inward of the outer periphery of the rotor, the spindle motor can be made simple and compact, so that the area required for installation decreases and the field of its application expands.

(5) By forming the thrust and radial bearing from a ceramic material, an oil free type or a minimal lubricant type spindle motor is obtained.

(6) By interposing a resilient pad between the thrust bearing and the base, machining errors of the base and the bearing can be compensated and it is therefore possible to maintain an excellent sliding condition.

(7) By forming a thrust gap type spindle motor, it is possible to eliminate a moment which would otherwise be generated due to the imbalance of radial magnetic force acting between the stator coil and the rotor magnet member and hence enable the motor to rotate with minimal vibrations.

(8) In the case of a large-sized spindle motor having a diameter of 5 to 8 inches, for example, even if the thrust bearing is disposed inwardly of the outer periphery of the rotor, the diameter and area of the thrust bearing can be increased, and by magnetically preloading the thrust bearing in the thrust direction, the inclination of the radial bearing is corrected and the rotor is capable of stably rotating without being sprung out by the dynamic pressure applied thereto in the thrust direction.

What is claimed is:

1. A spindle motor comprising a stator including a support shaft positioned on a base, a cap-shaped rotor rotatably and concentrically disposed around said support shaft and having an inner peripheral surface, thrust and radial bearings disposed between said stator and said rotor, a stator coil secured to said stator, and a rotor magnet member secured to said rotor in opposing relation to said stator coil, wherein said thrust and radial bearings are hydrodynamic bearings, said thrust bearing comprising movable and fixed pieces, said movable piece being secured to the lower end of a cylindrical portion of said rotor and extended outwardly from said cylindrical portion, said fixed piece being secured to said base in opposing relation to said movable piece, said stator coil being secured to the outer peripheral portion of said support shaft above said radial bearing, and said rotor magnet member being secured to the inner peripheral surface of said rotor so that a radial gap is provided between said stator coil and said rotor magnet member.

2. A spindle motor comprising a stator including a support shaft stood on a base, a cap-shaped rotor rotatably and concentrically disposed around said support shaft, thrust and radial bearings disposed between said stator and said rotor, a stator coil secured to said stator, and a rotor magnet member secured to said rotor in opposing relation to said stator coil, wherein said thrust and radial bearings are hydrodynamic bearings, said thrust bearing comprising movable and fixed pieces, said movable piece being secured to the lower end of a cylindrical portion of said rotor and extended outwardly from said cylindrical portion, said fixed piece being secured to said base in opposing relation to said movable piece, said stator coil being secured to the outer peripheral portion of said support shaft above said radial bearing, and said rotor magnet member being secured to the under side of a top of the cap-shaped rotor so that an axial gap is provided between said stator coil and said rotor magnet member.

3. A spindle motor comprising a stator including a support shaft stood on a base, a cap-shaped rotor rotatably and concentrically disposed around said support shaft, thrust and radial bearings disposed between said stator and said rotor, a stator coil secured to said stator, and a rotor magnet member secured to said rotor in opposing relation to said stator coil, wherein said thrust and radial bearings are hydrodynamic bearings, said thrust bearing comprising movable and fixed pieces, said movable piece being secured to the lower end of a cylindrical portion of said rotor and extended inwardly from said cylindrical portion, said fixed piece being secured to said base in opposing relation to said movable piece, and both said stator coil and said rotor magnet member being disposed above said radial bearing.

4. A spindle motor according to claim 3, wherein said rotor magnet member is secured to the under side of a top of the cap-shaped rotor so that an axial gap is provided between said stator coil and said rotor magnet member.

5. A spindle motor comprising a stator including a support shaft positioned on a base, a cap-shaped rotor rotatably and concentrically disposed around said support shaft, thrust and radial bearings disposed between said stator and said rotor, a stator coil secured to said stator, and a rotor magnet member secured to said rotor in opposing relation to said stator coil, wherein said thrust and radial bearings are hydrodynamic bearings, said thrust bearing comprising movable and fixed pieces, said movable piece being secured to the lower end of a cylindrical portion of said rotor and extended outwardly from said cylindrical portion, said fixed piece being secured to said base in opposing relation to said movable piece, and said rotor magnet member being secured to said rotor at a position which is inward of said movable piece of said thrust bearing.

6. A spindle motor according to claim 5, wherein said stator is secured to said base so that an axial gap is provided between said stator coil and said rotor magnet member.

7. A spindle motor according to claim 5, wherein said stator coil is secured to the lower part of said support shaft so that a radial gap is provided between said stator coil and said rotor magnet member.

8. A spindle motor comprising a stator including a support shaft positioned on a base, a cap-shaped rotor rotatably and concentrically disposed around said support shaft, thrust and radial bearings disposed between said stator and said rotor, a stator coil secured to said stator, and a rotor magnet member secured to said rotor in opposing relation to said stator coil,
wherein said thrust and radial bearings are hydrodynamic bearings, said thrust bearing being disposed above said radial bearing, and both said stator coil and said rotor magnet member being disposed below said radial bearing.

9. A spindle motor according to claim 8, wherein said stator coil is secured to said base so that an axial gap is provided between said stator coil and said rotor magnet member.

10. A spindle motor according to any one of claims 1 to 9, wherein said thrust bearing is preloaded by a magnetic force acting counter to a dynamic pressure acting in the direction of thrust.

11. A spindle motor according to any one of claims 1, 3, 5, 7, and 8, wherein the axial center of said rotor magnet member is offset from the axial center of said stator coil by a predetermined amount in the counter direction to the dynamic pressure generated from said thrust bearing, thereby preloading said thrust bearing in a counter direction to the dynamic pressure acting in the direction of thrust.

12. A spindle motor according to any one of claim 1 to 9, wherein said radial bearing is disposed so as to bear said rotor over a predetermined range including the center of gravity of said rotor.

13. A spindle motor according to any one of claims 1 to 9, wherein said fixed piece of said thrust bearing is secured to said stator through a resilient pad.

14. A spindle motor according ti claim 13, wherein said resilient pad is silicone rubber.

15. A spindle motor according to any one of claims 1 to 9, wherein said movable piece of said thrust bearing is secured to said rotor through a resilient pad.

16. A spindle motor according to claim 15, wherein said resilient pad is silicone rubber.

17. A spindle motor according to any one of claims 1 to 9, wherein the opposing annular sliding surfaces of said fixed and movable pieces of said thrust bearing are made of a ceramic material or made of a member coated with a kind of material different from the groundwork thereof or a member having a treated surface of degenerated groundwork thereof, and either of said sliding surfaces has spiral grooves for generating dynamic pressure.

18. A spindle motor according to claim 17, wherein said ceramic material is either silicon carbide or alumina.

19. A spindle motor according to any one of claims 1 to 9, wherein the opposing cylindrical sliding surfaces of said fixed and movable pieces of said radial bearing are made of a ceramic material material or made of a member coated with a kind of material different from the groundwork thereof or a member having a treated surface of degenerated groundwork thereof, and either of said cylindrical sliding surfaces has herringbone-shaped grooves for generating dynamic pressure.

20. A spindle motor according to claim 19, wherein said ceramic material is either silicon carbide or alumina.

21. A spindle motor according to any one of claims 1 to 4, 8 and 9, wherein some or all of said movable piece of said radial bearing, said rotor and said movable piece of said thrust bearing are arranged in an integral structure.

22. A spindle motor according to claim 21, either one or both of the moving pieces and the radial and thrust bearings in the integral structure are coated with a kind of material different from that of groundwork thereof, or the groundwork thereof is surface treated.

23. A spindle motor according to any one of claims 1, 2, 8 and 9, wherein some or all of said fixed piece of said radial bearing, said support shaft, said fixed piece of said thrust bearing and said base are arranged in an integral structure.

24. A spindle motor according to claim 23, either one or both of the fixed pieces of the radial and thrust bearings in the integral structure are coated with a kind of material different from that of groundwork thereof, or groundwork thereof is surface treated.

25. A spindle motor according to any one of claims 1 to 9, wherein said rotor has a support member adapted to hold hard disks on the outer peripheral surface thereof.

26. A spindle motor according to any one claims 1 to 9, wherein said support shaft is extended through a through-hole provided in the upper end portion of said rotor, and said support shaft being loosely fitted in said through-hole.

27. A spindle motor according to claim 26, wherein the distal end of said support shaft is secured to a stationary part.

28. A spindle motor according to any one of claims 1 to 9, wherein the upper end of said rotor is closed and not pierced by said support staff.

* * * * *